US012798436B2

(12) United States Patent
Kronenbitter

(10) Patent No.: US 12,798,436 B2
(45) Date of Patent: Nov. 17, 2026

(54) METHOD FOR DETERMINING AND USING A MODEL FOR AN ENERGY STORAGE OF A VEHICLE

(71) Applicant: Robert Bosch GmbH, Stuttgart (DE)

(72) Inventor: Dominik Kronenbitter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 18/342,256

(22) Filed: Jun. 27, 2023

(65) Prior Publication Data

US 2023/0415606 A1 Dec. 28, 2023

(30) Foreign Application Priority Data

Jun. 27, 2022 (DE) ..................... 10 2022 206 437.2

(51) Int. Cl.
*B60L 58/13* (2019.01)

(52) U.S. Cl.
CPC .................................... *B60L 58/13* (2019.02)

(58) Field of Classification Search
CPC .......... B60L 50/50; B60L 58/13; B60L 58/16; B60L 2240/12; B60L 2240/14; B60L 2240/54; B60L 2260/42; B60L 2260/52; B60L 2260/54; B60Y 2200/91; B60Y 2400/112; G06F 30/15; G06F 30/20; G06F 2119/06; G06F 2119/12; Y02T 10/70; Y02T 10/7072; Y02T 10/72
USPC ............................................................ 701/22
See application file for complete search history.

(56) References Cited

U.S. PATENT DOCUMENTS 6,625,539 B1 * 9/2003 Kittell ..................... B60L 50/66 701/32.4
10,605,868 B2 3/2020 Bamberger et al.
11,444,338 B1 * 9/2022 Dhawan .............. H01M 50/569
11,447,024 B1 * 9/2022 Brannan ............... B60L 53/665
11,691,518 B2 * 7/2023 Holme .................... B60L 58/16 701/22
2012/0316810 A1 * 12/2012 Syed ..................... H01M 10/42 702/85
2015/0298684 A1 * 10/2015 Schwartz .............. B60W 40/02 180/65.265

(Continued)

FOREIGN PATENT DOCUMENTS

DE 102019219436 A1 6/2021

*Primary Examiner* — Andrew R Dyer
(74) *Attorney, Agent, or Firm* — Michael Best & Friedrich LLP

(57) ABSTRACT

A method of determining a model (312) for an energy storage (120) of a vehicle (100) comprising: providing (300) a plurality of different, pre-determined power limits (P1, P2); determining (310), based on the power limits (P1, P2), a model (312), which outputs an output value ($y_n$) based on an input value (u), wherein the input value (u) comprises a power to be handled by the energy storage and/or power to be handled by the vehicle which is planned for a time point; wherein the output value ($y_n$) comprises a power limit at this time point, indicating a maximum amount of power to be handled by the energy storage for a given period of time; and providing the model (312). The invention also relates to a method for determining a current power limit of the energy storage using a model.

19 Claims, 2 Drawing Sheets

(56) References Cited

U.S. PATENT DOCUMENTS

| | | | | |
|---|---|---|---|---|
| 2016/0059733 | A1* | 3/2016 | Hettrich | B60L 58/27<br>701/2 |
| 2016/0301219 | A1* | 10/2016 | Desprez | H01M 10/0525 |
| 2017/0259684 | A1* | 9/2017 | Lee | B60L 53/665 |
| 2017/0338667 | A1* | 11/2017 | Loonen | H01M 10/0525 |
| 2018/0001777 | A1* | 1/2018 | Kilic | B60L 53/14 |
| 2021/0328270 | A1* | 10/2021 | Min | H02J 7/0013 |
| 2021/0356967 | A1* | 11/2021 | Gu | G06N 3/08 |
| 2022/0074995 | A1* | 3/2022 | Bharathraj | B60L 58/12 |
| 2022/0227397 | A1* | 7/2022 | Jiang | G06F 11/3013 |
| 2023/0071975 | A1* | 3/2023 | Singer | B60L 58/13 |
| 2023/0168310 | A1* | 6/2023 | Axelsson | G01R 31/389<br>429/50 |
| 2023/0271529 | A1* | 8/2023 | Bryngelsson | B60L 58/13<br>701/22 |
| 2023/0324190 | A1* | 10/2023 | Hirche | B60W 50/0097<br>701/123 |
| 2023/0382256 | A1* | 11/2023 | Tuukkanen | H02J 7/0048 |

* cited by examiner

METHOD FOR DETERMINING AND USING A MODEL FOR AN ENERGY STORAGE OF A VEHICLE

BACKGROUND

The present invention relates to a method for determining a model for an energy storage of a vehicle, a method for determining a power limit of an energy storage of a vehicle using such a model, a method for determining a sequence of actions to be performed by the vehicle, and a computing unit and a computer program for performing the same.

Modern vehicles, especially battery-electric vehicles, use functionalities that depend on a power capacity of an energy storage of the vehicle, e.g., a battery.

SUMMARY

According to the invention, a method for determining a model for an energy storage of a vehicle, a method for determining a power limit of an energy storage of a vehicle with such a model, a method for determining a sequence of actions to be performed by the vehicle as well as a computing unit and a computer program for carrying out the same.

The invention relates to vehicles, in particular battery-electric vehicles. In particular, a battery-electric vehicle means a vehicle that is purely electrically powered and uses one or more batteries as energy storages, namely batteries only.

Many functionalities in such vehicles can be realized, for example, in whole or in part, by software functions that are distributed among multiple controllers (or other computing units). As an example, we will look at adaptive driving speed control, also known as adaptive cruise control (ACC), in a battery-electric vehicle. Among other things, electrochemical and thermal limits in the battery (typically a high-voltage battery) must be taken into account as limiting conditions for planning the vehicle speed. Such planning of the vehicle speed can, for example, take place within the framework of a trajectory or its planning, wherein the acceleration and/or speed of the vehicle is planned ahead into the future. This can be the case, for example, in the case of an imminent overtaking maneuver, which is initiated, for example, by setting an indicator, and for which the vehicle speed will be automatically specified and set or regulated.

These energy storage limits can be determined, for example, within a battery management system (which is implemented, for example, on a battery control unit) and made available to other control units. An interface (data interface) that can be used for this purpose can be defined, for example, by long-term and short-term current and voltage limits—or generally power limits. Such a power limit indicates a maximum power that is available from the energy storage for a predetermined period of time.

An energy storage can not only provide (or deliver) power, e.g., while driving, but also store it, e.g., during charging or fast charging. In this respect, a power limit can also indicate a maximum power that can be stored. In addition to the energy storage, this also applies to the vehicle itself, for example. In the following, we will therefore also generally refer to a power that can be handled, indicating power that is to be provided (or delivered) and/or stored.

For example, as a basis for determining such power limits, it is assumed that a particular load is applied for a given time. For example, a power limit can indicate that a maximum current of 250 A at a voltage of 400V can be provided for a period of 20 s, that is, a maximum power of 100 kW can be provided for a period of 20 s. Similarly, a power limit can, for example, indicate that a maximum current of 300 A at a voltage of 400 V can be provided for a period of 5 s; in other words, a maximum power of 120 kW can be provided for a period of 5 s. In particular, a constant load is to be assumed in each case herein; that is, power to be taken from (or provided by) the energy storage and/or a power to be provided by the vehicle. The same applies to power that is to be stored.

These current and voltage limits, or power limits in general, can then be used in downstream sub-functionalities; for example, in order to plan a speed trajectory that does not violate these power limits; in particular, while also taking vehicle characteristics such as mass, driving resistance and the characteristics of the components of the drive train into account. Similarly, this also makes it possible to plan a charging or fast charging process, for example.

Typically, a battery management system only provides two such power limits for other functionalities, usually a short term limit such as the one for 5 s and a long term limit such as those for 20 s. If such a trajectory with specifications for acceleration and/or speed of the vehicle—or, more generally, a sequence of actions to be carried out by the vehicle, whereby the actions each specify a power to be drawn from the energy store and/or a power to be provided by the vehicle (or corresponding power to be drawn)—is to be planned by a functionality, the long term limit must generally be utilized for longer planning horizons, since the preview provided by the short term limit is too short.

In the example of an overtaking process with the two aforementioned power limits, this means, for example, that a maximum of 100 kW of power can be expected, since a typical overtaking process, possibly with a necessary buffer, cannot be completed within 5 s.

If, however, only the lower long term limit is utilized, a certain potential usually remains unused; since it has been shown that power values between the two limits would also be possible, depending on the duration of a planning horizon. This leads to a situation wherein the components of the drive train, including the energy storage such as the high-voltage battery, are built to be slightly oversized in order to achieve the desired power in case of doubt, or a reduced power level is accepted.

With consideration of this background, a model (which is generic in particular) for an energy storage of a vehicle, for example a battery (in particular a high-voltage battery) of a battery-electric vehicle is proposed, which is capable of dynamically determining and providing such power limits; that is, in particular, always an in particular future or predicted power limit, depending on the situation. Herein one aspect concerns the determination (or derivation) of such a model, while another aspect concerns an application of the model to determine current power limits and, in particular, also determine a sequence of actions (such as a trajectory). In addition to a speed trajectory, for example, a time schedule for charging or fast charging of the energy storage is also conceivable; this can be the case both in the case of external charging from a power grid and by way of recuperation.

To determine the model, a plurality of different predetermined power limits are provided. Such a predetermined power limit respectively indicates a maximum manageable (that is, in particular, available and/or storable) power for a predetermined period of time from the energy storage, such as the aforementioned short term and long term limits.

Based on the plurality of predetermined power limits, the model that outputs an output value based on at least one input value is then determined. Herein the at least one input value comprises a planned power to be drawn from the energy storage at a point in time and/or a power to be handled (provided or stored) by the vehicle; the output value then comprises a power limit at a point in time following this point in time, indicating a maximum power that can be handled (provided or stored) by the energy storage. This power can then be handled, in particular, at least up to a subsequent point in time. Such a model thereby makes it possible to always obtain a power limit for a planned power, with which—given the sequence of actions or the trajectory—the power can be planned for the subsequent time point or several subsequent time points. The model can in particular be provided for use in determining a sequence of actions for the vehicle.

When determining the model, parameters of the model are determined in dependence on the plurality of power limits. In particular, the model can be represented by one or more equations comprising certain parameters. An example of such equations is $$x_n = \frac{1}{\frac{T}{\Delta t} + 1} \cdot (K \cdot u - x_{n-1}) + x_{n-1}$$

$$y_n = x_n + b$$

wherein $y_n$ states the (current) value of the power limit (the output value) and $x_n$ states an in-model state. The variable u specifies the load planned at the time step or time point n−1 or the power planned at this time point to be drawn (or stored) from/in the energy storage and/or a power to be provided (or stored) by/in the vehicle (the input value). Δt specifies a time interval between two time points or time steps. These time points or time steps result from typically discrete planning of trajectories or other sequences of actions. This value for Δt can herein be fixed; however, it is also conceivable to design it variably: in this case, this time interval could also be used as an input value. The parameters K, T, b are parameters that can be determined or calculated from the plurality of predetermined power limits.

The example of these equations shows that three known power limits are required in order to determine the three parameters K, T, b. These can, for example, consist of three predetermined power limits obtained from, for example, a battery management system. However, it is also possible to obtain and use only two predetermined power limits. Herein it is preferred if a further power limit is determined based on the plurality of predetermined power limits (such as the two power limits). This can, for example, consist of a power limit that indicates a power that is permanently available from (or can be stored by) the energy storage. Such a further power limit can be determined, for example, based on the plurality of predetermined power limits, or it can also be obtained otherwise. For example, a particular energy storage can be able to permanently provide (or store) a specific power due to its design. A more detailed description of a possibility of determining parameter K, T, b follows in the figure description.

However, depending on the type of model used (e.g., number of parameters), more or fewer predetermined and/or further power limits can be required or utilized in order to determine the parameters of the model.

The model thereby comprises an internal state in particular, which changes or can change along the planning horizon and thus provides dynamic power limits, which—in turn—differ from the planned trajectory or can depend on the sequence of actions. In this manner, the capabilities of the drive train and energy storage can be optimally utilized.

Although the predetermined power limits do not change for at least a certain period of time, they can still change under certain circumstances; for example, due to aging of the energy storage or in the case of prolonged, intense use of the energy storage; in this latter case, also due to heating, for example. Herein it is preferred if the model is newly determined or adjusted when there are one or more new predetermined power limits. This can be done automatically, for example, when a new predetermined power limit is obtained; however it is also conceivable to periodically query new predetermined power limits and then perform any required adjustments.

The model is then applied when determining a power limit of an energy storage of a vehicle for use in determining a sequence of actions for the vehicle, particularly a trajectory. In particular, the power limit to be determined is a future or predicted power limit. At least one input value for the model is obtained or provided, wherein the input value comprises a power to be drawn by (or stored in) the energy storage and/or a power to be provided by (or stored in) the vehicle that is planned at a time of one of the actions. An output value is then determined using the model, wherein the output value comprises a (current) power limit at a time point subsequent to this time point, indicating a maximum power that can be provided (or stored) by the energy storage. The output value is then provided or output, and in particular used in determining the sequence of actions; that is, at this subsequent time, a power to be drawn (or to be stored) from/by the energy storage and/or a power to be provided (or to be stored) by the vehicle can then be scheduled, at most corresponding to the output value. Furthermore, it can be provided that a highest power limit of the predetermined multiple power limits is additionally used as an upper limit.

A determination of a current power limit is thereby possible. This application of the model—which can, in particular, consist of a model that is or was determined as explained above—can herein be carried out separately from a determination of the sequence of actions. Thereby the sequence of actions (or the trajectory) can be performed on a different computing unit or control unit than the application of the model. The computing unit performing the application of the model can thereby always receive an input value and output an output value, and in particular, do so repeatedly for each time point of the sequence of actions.

Preferably, however, the determination of output values takes place within the context of determining a sequence of actions for a vehicle, that is, also on the same computing unit performing these tasks. The sequence of actions includes actions to be performed by the vehicle at different, in particular evenly spaced, time points; the determination is made while taking a capacity of an energy storage of the vehicle into account. Herein an input value for the model is determined for each of the time points, and an output value is determined by the model according to a method described above.

In this manner, a sequence of actions or a trajectory can be planned for the vehicle, always taking a current power limit into account (i.e., at any given time).

A computing unit according to the invention, e.g., a control unit of a vehicle, is configured, in particular in terms of program technology, so as to carry out a method according to the invention.

The implementation of a method according to the invention in the form of a computer program or computer program product with program code for carrying out all method steps is also advantageous since this results in particularly low costs, in particular if an executing control unit is also used for further tasks and is therefore already present. Lastly, a machine-readable storage medium is provided, on which the computer program is stored as described above. Suitable storage media or data carriers for providing the computer program are in particular magnetic, optical and electrical memories, such as hard disks, flash memory, EEPROMs, DVDs, etc. Downloading a program via computer networks (internet, intranet, etc.) is also possible. Such a download can take place in a wired or cabled or wireless manner (e.g., via a WLAN, a 3G, 4G, 5G, or 6G connection, etc.).

Further advantages and configurations of the invention become apparent from the description and the accompanying drawing.

The invention is illustrated schematically in the drawing on the basis of embodiment examples and is described in detail in the following with reference to the drawing.

DETAILED DESCRIPTION

Figure 1:
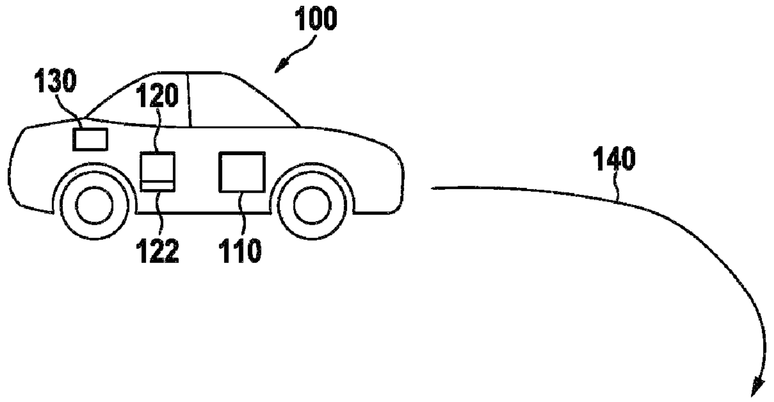
FIG. 1 schematically shows a vehicle in which a method according to the invention can be performed.

FIG. 1 schematically shows a vehicle 100 wherein a method according to the invention can be performed. The vehicle is, by way of example, a battery-electric vehicle and includes an electric drive (electric motor) 110 and an energy storage 120 that is designed as a battery with a battery controller 122 for a battery management system. The vehicle furthermore comprises a computing unit 130 that is designed as a control unit, on which a method according to the invention can be performed in a preferred embodiment.

For example, a driver assist function for adaptive speed control can also be performed on the control unit 130; for example, wherein a trajectory 140 is determined, which includes commands regarding the acceleration and/or speed of the vehicle 100. The trajectory 140 is thereby a sequence of actions to be performed by the vehicle at various times. Herein these actions are to be performed while taking a power capacity of an energy storage of the vehicle into account, wherein the actions to be performed by the vehicle respectively specify a power to be drawn from the energy storage and/or a power to be provided by the vehicle. Such power is provided, for example, based on the desired acceleration or speed at the respective time, in particular also taking further vehicle parameters into account.

Figure 2:
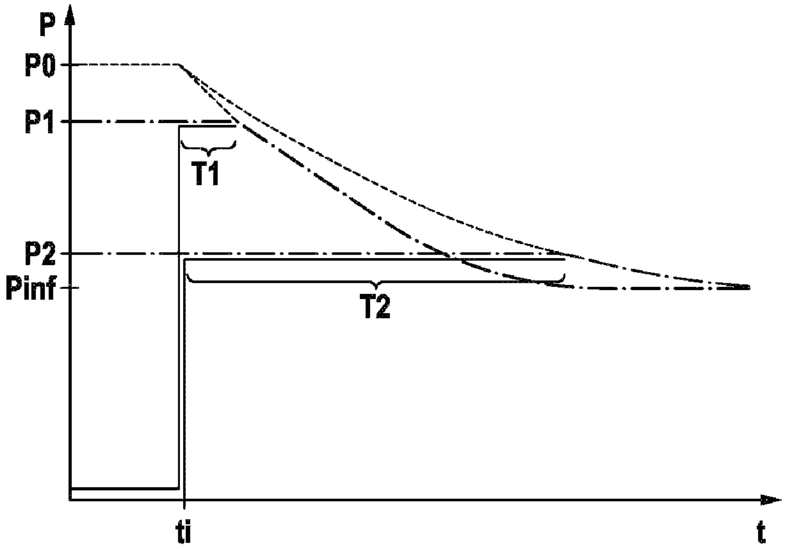
FIG. 2 schematically shows a diagram to explain a method according to the invention in a preferred embodiment.
Figure 3:
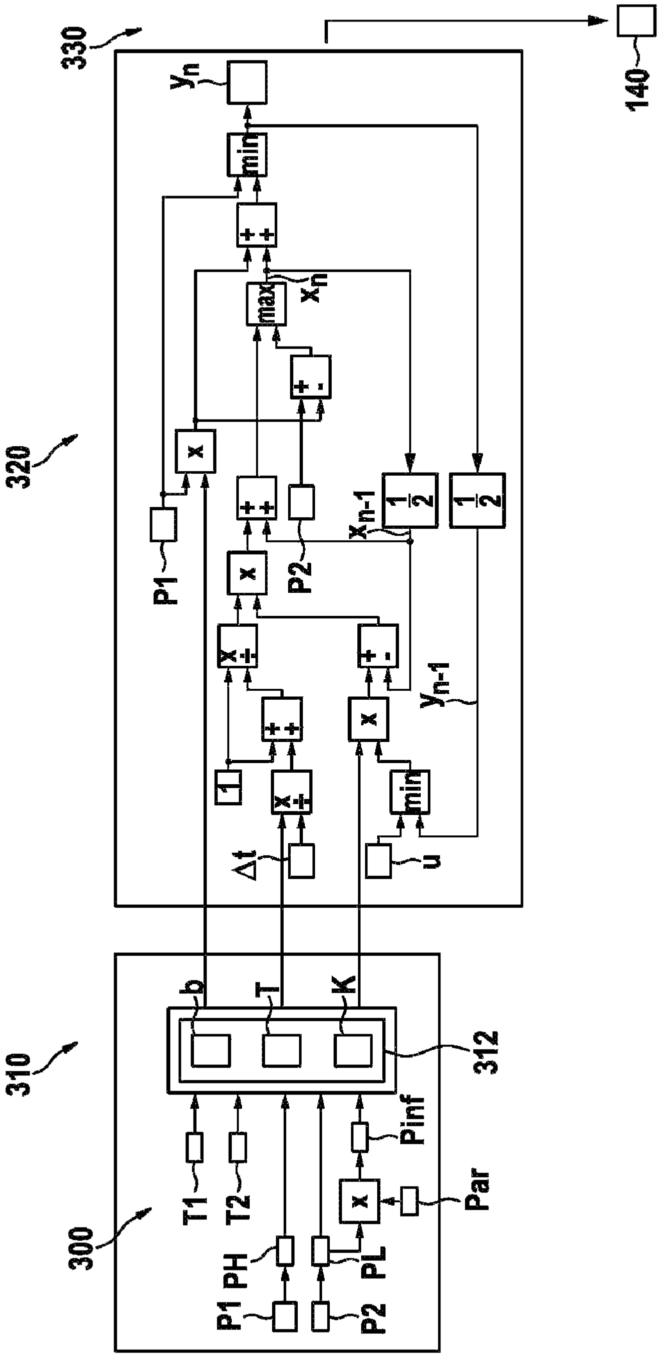
FIG. 3 schematically shows a sequence of a method according to the invention in a preferred embodiment.

FIG. 2 schematically shows a diagram to explain a method according to the invention in a preferred embodiment. In the diagram, a power P is plotted over a time t. FIG. 3 schematically shows a sequence of a method according to the invention in a preferred embodiment. Based on FIG. 2 and FIG. 3, we will first explain how the model can be determined.

As mentioned, for example, two predetermined power limits are provided by a battery management system in a vehicle. These power limits each indicate a maximum power that is available from the energy storage for a predetermined period of time. In the diagram in FIG. 2, two such power limits P1 and P2 are shown by way of example. The value shown by P1 or P2 indicates the maximum power that can be provided by the energy storage for the corresponding duration T1 or T2. Herein the power is to be requested at time ti (load jump).

For example, the power limit P1 can indicate that a maximum power of P1=120 kW can be provided for a duration of T1=5 s. Similarly, for example, the power limit P2 can indicate that a maximum power of P2=100 kW can be provided for a time period of T2=20 s.

In the diagram in FIG. 2, based on the values for P1 and P2, it can also be seen that the value drops off slowly after the time period T1 or T2. However, both courses approach a further power limit Pinf, which indicates a power that the energy storage can provide permanently, or at least for a period of time that is very large compared to T2. This further power limit Pinf can depend on the energy storage and can, for example, be 90% of the power P2; i.e., 90 kW in this case.

In determining the model, in step 300 according to FIG. 3, the plurality of different predetermined power limits P1, T1 and P2, T2 are provided. These can be obtained, for example, from the battery management system. Parameters of the model are then determined in step 310 as a function of such predetermined power limits. For example, the model 312 can be $$x_n = \frac{1}{\frac{T}{\Delta t} + 1} \cdot (K \cdot u - x_{n-1}) + x_{n-1}$$

$$y_n = x_n + b$$

represented by the equations. In addition, instead of the time-discrete representation above, a continuous representation can be selected:

$$x = K \cdot u \cdot \left(1 - \exp\left(-\frac{t}{T}\right)\right)$$

$$y = x + b$$

The parameters K, T, b are parameters that can be determined or calculated from the plurality of predetermined power limits; that is, for example, by the power limits P1, P2 and Pinf. The specific power values P1 and P2 can be used, for example, directly as the upper and lower power values PH and PL. The value for Pinf can be obtained, for example, via a factor par; for example, 0.9, from P2 or PL.

When determining the parameters, conversion of the equation is typically required. The duration Δt is no longer necessary for the continuous representation (or can otherwise be selected appropriately), and the variable u can be selected appropriately.

The model equations result from the conversion of the formulas and the use of the following exemplary values t=∞, u=Pinf, y=Pinf, T1=5 s, u=PH, y=PH and T2=20 s, u=PL, y=PL the equations for determining the parameters K, T, b result from the input variables Pinf,PL,PH,T1,T2:

$$T = \frac{T2 - T1}{\log\left(\frac{\frac{Pinf}{PH} - 1}{\frac{Pinf}{PL} - 1}\right)}$$

$$K = \frac{Pinf - PL}{PL \cdot \left(\exp\left(-\frac{T2}{T}\right) - 1\right) + Pinf}$$

$$b = Pinf - K \cdot Pinf$$

Furthermore, a theoretical base power limit P0 that is above the short term power limit P1 can be assumed. This base power limit is an in-model but otherwise not further required quantity (auxiliary quantity); it represents the theoretical power that could be provided for an infinitely short period of time at most.

The model 312 can then output an output value based on an input value, wherein the input value comprises a planned power to be drawn from the energy storage and/or power to be provided by the vehicle at a time; that is, the variable u from above, and wherein the output value comprises a power limit at that time, which indicates the power to be available from the energy storage at most for a period of time; that is, the value $y_n$ from above. This will be explained below within the context of the application of the model.

The model 312 that is thereby determined is then provided or output, for example, to another functionality (in the same or another performing computing unit) wherein the model is utilized or applied.

As mentioned, the model 312 can be re-determined, for example, whenever one or more new (or different) power limits exist. This can be due to, for example, aging of the energy storage, or thermal stress.

Thus, as part of the model application, a current power limit of the energy storage is determined for use in determining a sequence of actions (such as a trajectory) for the vehicle.

For this purpose, an input value u for the model 312 is obtained or provided. The input value u comprises a planned power to be drawn from the energy storage at a time step or time point of n−1 one of the actions, and/or a power to be provided by the vehicle. In a step 320, an output value $y_n$ is then determined using the model 312. The output value includes a power limit at the subsequent time point n that is indicative of a maximum power available from the energy storage. This is done according to the equations already mentioned $$x_n = \frac{1}{\frac{T}{\Delta t} + 1} \cdot (K \cdot u - x_{n-1}) + x_{n-1}$$

$$y_n = x_n + b$$

Wherein the time point Δt can be set to a small value of e.g., 0.01 s. The flowchart shown in step 320 in FIG. 3 shows these equations. It can also be seen, for example, that the value for u is limited to the limit value (power limit) of $y_{n-1}$ the associated time step. Herein further conditions can also be considered. For example, the initial value $y_n$ or generally the value of the predetermined power limit P1 is limited. Furthermore, the initial value is limited $y_n$ downwards, for example, as a function of the values of the predetermined power limits P1 and P2.

The step 330 may be applied repeatedly in a loop or type of loop to ultimately determine a sequence of actions in step 330, such as the trajectory 140. This loop signifies that for each further time point or time step, a new current power limit is progressively determined, on whose basis a power to be drawn from the energy storage and/or a power to be provided by the vehicle can again be determined to extend the trajectory.

The processes herein described in relation to the maximum available power apply correspondingly to the maximum power that can be stored.

The invention claimed is:

1. A method for controlling a vehicle according to a sequence of actions for the vehicle, the method comprising:

deriving a model for determining a power limit of an energy storage for the vehicle;

providing or obtaining at least one input value for the model, wherein the at least one input value comprises a planned power load for a first time point;

providing a plurality of different predetermined power limits, each predetermined power limit indicating a maximum power that can be handled by the energy storage for a predetermined period of time, including a first predetermined power limit indicative of a first maximum power to be handled for a first predetermined period of time and a second predetermined power limit indicative of a second maximum power to be handled for a second predetermined period of time different than the first predetermined period of time;

determining parameters of the model as a function of the plurality of different predetermined power limits;

determining an output value by means of the model, wherein the output value comprises a predicted power limit at a second time point subsequent to the first time point indicating a maximum amount of power to be handled by the energy storage;

specifying the predicted power limit for at least one of the energy storage or the vehicle as part of the sequence of actions; and controlling a trajectory of the vehicle by at least one of drawing power from the energy storage or providing power by the vehicle according to the predicted power limit.

2. A method according to claim 1, further comprising determining the sequence of actions at evenly spaced time points, wherein the at least one input value for the model comprises the output value at a previous time point and a corresponding output value is determined for each of the evenly spaced time points by means of the model.

3. The method according to claim 2, wherein the sequence of actions is further determined while taking at least one selected from the group consisting of static and dynamic characteristics of the vehicle into account.

4. The method according to claim 1, wherein the trajectory is a speed trajectory.

5. The method according to claim 1, further comprising determining a time schedule for charging the energy storage.

6. The method of claim 5, wherein charging occurs via external charging from a power grid or via recuperation.

7. The method of claim 1, wherein the trajectory includes an overtaking maneuver.

8. The method of claim 1, wherein the maximum power is a voltage and amperage that can be provided by the energy storage for the predetermined period of time.

9. A method of controlling a vehicle, the method comprising:

determining a plurality of different predetermined power limits for a battery management system of the vehicle, each predetermined power limit indicating a maximum power that can be handled by an energy storage for a predetermined period of time, including a first predetermined power limit indicative of a first maximum power to be handled for a first predetermined period of time and a second predetermined power limit indicative of a second maximum power to be handled for a second predetermined period of time different than the first predetermined period of time;

determining parameters as a function of the plurality of different predetermined power limits, deriving a model for determining a current power limit of the energy storage based on the parameters, determining at least one input value comprising a power to be handled by at least one of the energy storage or the vehicle and planned for a first time point, applying the model by receiving the at least one input value and outputting an output value comprising a power limit at a second time point subsequent to the first time point and indicating a maximum power that can be handled by the energy storage;

determining a sequence of actions for the vehicle based on the output value; and controlling a speed of the vehicle based on the sequence of actions.

10. The method of claim 9, wherein the sequence of actions is determined as a trajectory or as part of a trajectory, wherein the trajectory comprises commands for acceleration of the vehicle.

11. The method of claim 10, wherein the trajectory includes an overtaking maneuver.

12. A method according to claim 9, wherein the vehicle is a battery-electric vehicle.

13. A computing unit that is configured to perform all method steps of a method according to claim 9.

14. The method according to claim 9, wherein the model is determined based on the plurality of predetermined power limits and at least one further power limit, wherein the at least one further power limit is determined on the basis of the plurality of predetermined power limits.

15. The method according to claim 9, wherein the model is redetermined in the presence of one or more new predetermined power limits.

16. The method according to claim 9, further comprising determining a time schedule for charging the energy storage.

17. The method of claim 16, wherein charging occurs via external charging from a power grid or via recuperation.

18. The method of claim 9, wherein the maximum power is a voltage and amperage that can be provided by the energy storage for the predetermined period of time.

19. A non-transitory, computer-readable storage medium containing instructions that when executed on a computer cause the computer to provide a plurality of different predetermined power limits, each predetermined power limit indicating a maximum power that can be handled by an energy storage for a predetermined period of time, including a first predetermined power limit indicative of a first maximum power to be handled for a first predetermined period of time and a second predetermined power limit indicative of a second maximum power to be handled for a second predetermined period of time different than the first predetermined period of time;

determine, based on the plurality of predetermined power limits, a model outputting an output value based on at least one input value, by determining parameters of the model as a function of the plurality of different predetermined power limits, wherein the at least one input value comprises a planned power to be, at a first time point, by at least one selected from the group consisting of drawn from the energy storage and handled by a vehicle, wherein the output value comprises a predicted power limit at a time point subsequent to the first time point that indicates a maximum power which can be handled by the energy storage;

use the model to determine a sequence of actions for the vehicle; and control the vehicle according to the sequence of actions.

* * * * *